July 29, 1969　　　F. MARTINOLA ET AL　　　3,458,436
PROCESS FOR THE TREATMENT OF LIQUIDS WITH ION EXCHANGERS
Filed Nov. 18, 1964

INVENTORS:
FRIEDRICH MARTINOLA, GÜNTER SIEGERS, ERWIN WOLNIEWICZ.
BY
*their* ATTORNEYS

United States Patent Office 3,458,436
Patented July 29, 1969

3,458,436
PROCESS FOR THE TREATMENT OF LIQUIDS WITH ION EXCHANGERS
Friedrich Martinola, Cologne-Flittard, Günter Siegers, Cologne-Hohenberg, and Erwin Wolniewicz, Opladen, Germany, assignors to Farbenfabriken Bayer Aktiengesellschaft, Leverkusen, Germany, a German corporation
Filed Nov. 18, 1964, Ser. No. 411,977
Claims priority, application Germany, Nov. 29, 1963, F 41,422
Int. Cl. C02b *1/40, 1/76*
U.S. Cl. 210—20           6 Claims

ABSTRACT OF THE DISCLOSURE

A process and device for treating liquids with ion exchangers by passing liquid upwardly through an ion exchanger material in a container containing about 25–75% by weight of the exchanger material in a fluidized condition and the remainder in a densely packed state. A regeneration step being thereafter effected by passing regenerating agent downwardly through the same ion exchanger material arranged and maintained in a densely packed state.

---

Ion exchangers are used for purifying liquids and for the working up of solutions, by reacting with the ions which are in solution. In order to achieve this reaction, it is necessary to bring the mass of ion exchanger into contact with the liquid. On an industrial scale, it is usual to have the ion exchanger mass in a container which has an inlet and an outlet opening for the liquid (filtering apparatus). In this filter, the bed of exchanger is always tightly packed during the three most important phases of the cycle; the charging, the regeneration and the washing out of excess regenerating agent, during which phases it is contacted respectively by the liquid which is being exchanged, by the solution of the regenerating agent and the washing water. This dense packing of all the exchanger mass during these three phases has always been considered essential for the technically satisfactory operation of an ion exchanger, that is to say, for lowest possible expenditure of regenerating agent with the smallest possible residual content of ions to be reacted. In the above described arrangement, the exchanger material is usually held by a filter plate, for example, a perforated plate.

A process for the treatment of liquids by means of ion exchangers has now been discovered in which a technically satisfactory operation is also guaranteed if some, advantageously 25 to 75% by volume, of the total ion exchanger mass while retained in a substantially less densely packed form is brought into contact with the solution to be processed (i.e. as a suspended or fluidised bed). In order to combine the best possible consumption of regeneration agent with the smallest possible residual content of ions, it is sufficient that 25 to 75% of all the exchanger mass be in a densely packed form (compact bed) when it is traversed by the solution to be processed after the solution has been in intimate contact with the remaining exchanger mass which is not densely packed. When the exchanger is regenerated, that part of it which is in the tightly packed bed must first of all be treated with the regeneration agent provided for the whole of the exchanger. Thereafter the regeneration agent runs into that portion of the exchanger which is utilized as a fluidized bed when in use. This portion is in the form of a compact bed during regeneration, however. The suspended bed (fluidized bed) and the following compact bed can be arranged in one or in several containers.

Figure 1:
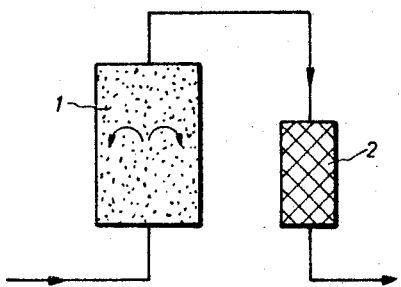

The enclosed FIGURE 1 demonstrates an arrangement of filters suitable for the above purpose. In this figure a conventional filter apparatus 1 is used as a fluidized bed and a conventional filter apparatus 2 used as a fixed bed. The fluid to be treated with the ion exchanger is passed through these two filters as indicated. In filter 1, which as an inlet at the bottom, the ion exchanger is suspended in the fluid, whereas filter 2 has the inlet at the top, the ion exchanger settling at the bottom.

Figure 1A:
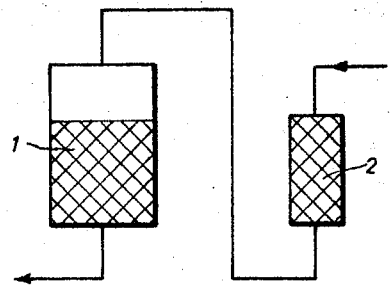

FIGURE 1a shows the same filter arrangement in the regeneration phase. The regenerating agent is here fed from the top, causing the ion exchanger to settle down and form a fixed bed.

In one preferred embodiment of the invention, the suspended bed and compact bed are formed in one filter. This is achieved by passing the solution to be prepared vertically upwards through the exchanger mass during the charging phase. Depending upon the flow velocity, density, viscosity and temperature of the solution and also upon the specific gravity, the grain form and grain size of the exchanger which is used and the filling height of the exchanger mass in the filtering apparatus, a larger or smaller proportion of the existing exchanger mass will be in a state of suspension. The remainder is forced on to a device forming the upper closure of the filter tube, e.g. a perforated plate 1, which permits the passage of the liquid without entraining exchanger material. After completing the charging operation, the exhausted exchanger is treated with a solution of regenerating agent, which flows from top to bottom through the exchanger bed, which is now completely in a densely packed condition, and is washed out in the same direction.

Figure 2:
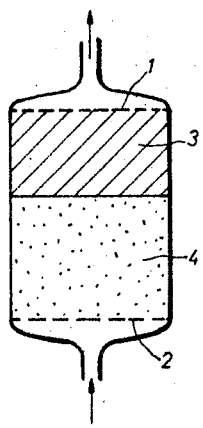
Figure 2A:
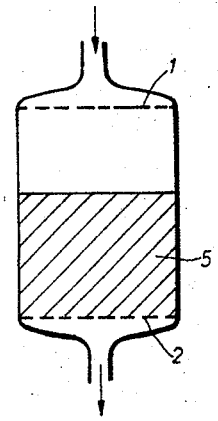

The preferred embodiment of the invention is illustrated in FIGURES 2 and 2a. FIGURE 2 diagramatically shows a filter apparatus which is fitted with an upper perforated plate 1 and a lower perforated plate 2, the arrows indicating the direction of fluid passage through the filter. FIGURE 2 also demonstrates the treatment of a fluid with the ion exchanger. As the untreated fluid is passed through the filter 2 from bottom to top, the lower part of the ion exchanger mass forms a fluidized or suspended phase 4 and part is pressed against the upper perforated plate 1 forming a fixed densely packed bed 3.

FIGURE 2a shows the same apparatus during the regenerating step. A regenerating agent is passed downward as indicated by the arrows, causing all of the ion exchanger material to settle down against the lower perforated plate 2 and forming a fixed densely packed bed 5.

A number of measurements in connection with normal commercial cation and anion exchangers are given as examples in Tables 1 and 2 for the formation of suspended and solid beds. These exchangers were exposed in the arrangement as described above to an upwardly directed stream of water at 15° C.

TABLE 1.—CATION EXCHANGER

[Polystyrene-sulphonic acid cross-linked with 5% of divinyl benzene]

| | Percent suspended bed, filling height between the perforated plates | |
|---|---|---|
| Water velocity, m./h. | 90% | 80% |
| 4 | 100 | 100 |
| 6 | 70 | 95 |
| 12 | 43 | 55 |
| 18 | 32 | 43 |
| 30 | 24 | 30 |

TABLE 2.—ANION EXCHANGER

[Aminated polystyrene cross-linked with 5% of divinyl benzene, exchanger, filling height of the test filter 90%]

| | Percent suspended bed | |
|---|---|---|
| Water velocity in m./h. | Exchanger $A^1$ (See Example 2) | Exchanger $A^2$ (See Example 3) |
| 3 | 100 | 38 |
| 5.4 | 71 | 23 |
| 7.2 | 41 | 20 |
| 9.0 | 38 | 17 |
| 12.6 | 26 | 13 |
| 18 | 19 | 8 |

Using the process according to the invention leads to the advantages which are set out below, by comparison with the known process of charging ion exchangers in a solid bed.

(1) The process makes it possible to charge and to regenerate the ion exchanger in counter-current with all the advantages of this method of operation, such as the maximum utilisation of regeneration agent combined with the smallest possible residual content of ions which are to be reacted. A densely-packed exchanger has hitherto been necessary for carrying out this method of operation.

(2) When using the process according to the invention, only some of the total exchanger mass is in densely packed form, which offers a higher resistance to liquids flowing through than does a fluidised bed. Consequently, with this process there is a substantially lower pressure loss compared with the known procedure, in which all the exchanger mass forms a compact bed. Table 3 shows a comparison of the two methods of procedure, this clearly showing the difference.

TABLE 3.—CATION EXCHANGER (SULPHONATED POLYSTYRENE CROSS-LINKED WITH DIVINYL BENZENE)

[Bed height 1,000 mm., filling of the exchanger column 83%]

| | Pressure loss, m. water column | | Percent fluidised bed, upwards |
|---|---|---|---|
| Direction of flow | Downwards | Upwards | |
| Flow velocity (m./h.) | | | |
| 7.2 | 1.0 | 0.29 | 93 |
| 10.8 | 1.51 | 0.61 | 62 |
| 14.5 | 2.05 | 1.0 | 48.5 |
| 18.1 | 2.6 | 1.3 | 41.5 |
| 21.7 | 3.1 | 1.65 | 35.5 |

(3) Another great advantage of the new process is the fact that, when the compact bed is formed at the upper end of the filtering apparatus no channel can be formed in the exchanger mass either during formation of the bed or during the charging. If the compact bed is traversed more quickly at one point of the filter cross-section than in other sections, after formation of a channel exchanger mass is immediately and automatically supplied from the suspended or fluidised bed until the pressure differences are balanced.

The converse procedure occurs when there is an increase in the resistance in the compact bed, e.g. through swelling of the exchanger material during charging. An increase in the resistance causes a lowering of the flow velocity, and this brings about a transfer of exchanger mass from the compact bed to the suspended bed. As a consequence, the resistance of the compact bed falls, so that the original pressure conditions and flow velocities are readjusted.

A flow condition, once it is produced by upward flow of a liquid in a filtering apparatus filled with ion exchanger, is thus automatically stabilised if the ion exchanger mass is present partly as a suspended or fluidised bed and partly as a compact bed at the upper end of the exchanger column.

(4) An additional advantage of the process is that the ion exchanger material which is in the suspended or fluidised bed is quickly and completely charged, because of its intimate contact with the liquid to be prepared. Thus, during regeneration it is able to utilise very thoroughly the regenerating agent discharged from the compact bed, which is now upstream.

The advantages of the process using both a suspended or fluidised and a solid bed in a filter are shown by the following examples.

EXAMPLE 1

A cylindrical filter body with a diameter of 800 mm., which is closed top and bottom by a perforated plate, was filled with 905 litres of a cation exchanger. The exchanger occupied 90% of the volume available. The cation exchanger used was a synthetic resin which had been produced by sulphonation of polystyrene cross-linked with divinyl benzene.

Regeneration was effected by passing 500 litres of 10% by weight hydrochloric acid from top to bottom, and washing out in the usual manner with 1800 litres of decationised water.

During charging, water flowed through the filter from bottom to top at a velocity of 6 m./h., 70% of the exchanger mass being present as a suspended bed. The water contained hardness in a concentration of 14° d. and sodium salt corresponding to 10° German hardness. Up to breakthrough of ions, the exchanger mass took up 1.26 kiloequivalent of ions from the water. If the quantity of acid consumed is related to the ions taken up, calculation shows an acid excess of 8.5%.

For the measurement of the small traces of cations remaining in the water, it was conducted over a strongly basic ion exchanger. After this exchanger, the conductivity was 0.85 to 1.3 $\mu$s./cm. In order to produce water of similarly high purity by means of regeneration and charging from top to bottom, a 180% excess of acid would have to be used.

EXAMPLE 2

A tube with an internal diameter of 188 mm. was closed by a perforated plate at each end and 90% filled with an anion exchanger. The exchanger ($A_1$) was produced by introducing dimethyl enthanolamine groups into polystyrene resin, which had been cross-linked with divinylbenzene. The filling height was 108 cm. During regeneration, 34 litres of a 4% by weight solution of sodium hydroxide was sent through the filter from top to bottom. 90 litres of salt-free water were used for the washing.

The exchanger was charged with decationised water in the direction from bottom to top. At the maintained velocity of 5.4 m./h., 71% of the total exchanger mass was kept in suspension, while the remainder was pressed against the upper perforated plate. The water freed from cations by means of cation exchangers contained:

| | Mg./l. |
|---|---|
| Hydrochloric acid | 132 |
| Sulphuric acid | 68 |
| Carbon dioxide ($CO_2$) | 179 |
| Silicon dioxide ($SiO_2$) | 8 |

In the discharging salt-free water, the residual quantity of silicon dioxide was 0.026 mg./l. 28.7 equivalents of ions were taken up by the time the exchanger was exhausted. Accordingly, the excess of regenerating agent was 18%. In a normally operated installation, in which both regenerating agent and charging solution flow through the filter from top to bottom, it is necessary to use an excess of 200% in order to produce an equal capacity.

EXAMPLE 3

A tube as in Example 2 was 82% filled with an anion exchanger. The exchanger ($A_2$) was prepared from polystyrene, which was cross-linked with divinyl benzene. The polystyrene structure contained trimethylamine groups as centres active for ion exchange. The exchangers was regenerated by passing 31 litres of a 2% by weight sodium hydroxide solutions from top to bottom. The excess regenerating agent was washed out with 95 litres of salt-free water.

The exchanger was then charged with decationised water, as in Example 2. The upwardly directed stream of water had a velocity of 7.2 m./h., and 35% of the exchanger filling was suspended in the liquid, whilst the remainder formed a densely packed bed.

The residual silicon dioxide concentration in the salt-free water was 0.02 mg./l. 12.5 equivalents of ions were taken up by the time the exchanger was exhausted. The excess of regenerating agent is thus 24%. In order to obtain an equal exchange capacity by regeneration and charging in one direction, namely from top to bottom, 2½ times the quantity of solution used in this example would be required, according to the data given by manufacturers of ion exchangers.

EXAMPLE 4

A cation exchanger of the type used in Example 1 in a filter tube with perforated plates at the top and at the bottom was regenerated by passing hydrochloric acid downwardly and washed out. Tap water was then introduced from below into the filter at a velocity of 10 m./h. As already described, a suspended bed was formed, above which was disposed a compact bed. Water could be extracted between the suspended bed and the compact bed by means of a discharge pipe. Analysis showed that the exchanger in the suspended bed was completely exhausted after the passage of a total of 15.1 val., that is to say, no more hydrogen ions were discharged to the solution flowing through. Of the 15.1 val. of cations, 11.75 val. were taken up by the suspended bed. The residue of 3.35 val., or 22.2% of all the cations present, were absorbed by the following compact bed.

We claim:

1. A process for treating liquids with ion exchanger material comprising initially contacting the liquid and exchanger material in a fluidized bed and thereafter contacting the liquid and further exchanger material in a compact bed, the fluidized bed containing about 25%–75% by volume of the combined total ion exchanger material, regenerating the ion exchanger material as desired in at least one compact bed.

2. The process of claim 1 wherein the fluidized bed and the compact bed are maintained in a single closed vessel having top and bottom apertures adaptable to substantially vertical flow, said top and bottom aperture being guarded by internally mounted perforated screening plates.

3. A process according to claim 1 wherein a regeneration solution and wash water are passed through the vessel from top to bottom through densely packed exchanger.

4. A device for treating liquids with ion exchanger material consisting essentially of a closed vessel having a bottom and a top aperture, a lower perforated plate adapted for supporting and screening ion exchanger material mounted transversely across the bottom of said vessel above said bottom aperture, an upper perforated plate adapted for screening ion exchanger material and mounted transversely across the upper end of said vessel, below said top aperture, exchanger material within said vessel positioned between said perforated plates; said lower and upper plates being sufficiently distant and said vessel being designed, constructed, and of a volume to permit simultaneously maintaining a lower fluidized exchanger bed and an upper compact exchanger bed in contact with said upper perforated plate within said vessel by passing untreated liquid through said bottom aperture and plate, the liquid thereafter passing out through said upper perforated plate and out of the vessel through said top aperture during charging, said device being designed and constructed for reverse flow during regeneration of the exchanger material.

5. A device for treating liquids with ion exchanger material comprising a first and second vessel connected in series, said first and second vessel having upper and lower apertures guarded by mounted perforated screening plates substantially impermeable to said material, said first vessel being filled up to about 75% by volume with ion exchanger material and flowably connected to said second vessel through said upper apertures, said second vessel being substantially filled with ion exchanger material to effect passing a liquid to be treated through said lower aperture of said first vessel, through said upper aperture of said first vessel, and through said upper aperture of said second vessel and out through said lower aperture of said second vessel.

6. A process for treating liquids with ion exchanger material in a single container, comprising initially passing said liquids upwardly through a lower fluidized ion exchange bed containing about 25 to 75% by weight of said materials, thereafter passing said liquids upwardly through a packed exchanger bed located above said fluidized bed and thereafter regenerating said exchanger material as desired, by passing a regenerating agent downwardly in a reverse direction into the common exchanger material in a packed state at the bottom of said container.

References Cited

UNITED STATES PATENTS

| | | | |
|---|---|---|---|
| 356,819 | 2/1887 | Bell | 210—259 |
| 1,697,835 | 1/1929 | McGill | 210—266 |
| 1,698,743 | 1/1929 | Sweeney | 210—35 |
| 3,171,802 | 3/1965 | Rice et al. | 210—252 X |
| 3,312,617 | 4/1967 | Klein | 210—35 |
| 3,173,862 | 3/1965 | Clements et al. | 210—20 |
| 2,891,007 | 6/1959 | Caskey et al. | 210—35 |

FOREIGN PATENTS

| | | |
|---|---|---|
| 230,587 | 6/1960 | Australia. |
| 1,363,510 | 5/1964 | France. |
| 756,735 | 9/1956 | Great Britain. |

REUBEN FRIEDMAN, Primary Examiner

F. A. SPEAR, Jr., Assistant Examiner

U.S. Cl. X.R.

210—35, 266, 275, 289